US012746994B2

(12) United States Patent
Nomoto et al.

(10) Patent No.: US 12,746,994 B2
(45) Date of Patent: Sep. 29, 2026

(54) ASSEMBLING PRODUCTION SYSTEM

(71) Applicant: Honda Motor Co., Ltd., Tokyo (JP)

(72) Inventors: Hiroaki Nomoto, Tokyo (JP); Saeko Komatsu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 18/433,305

(22) Filed: Feb. 5, 2024

(65) Prior Publication Data

US 2024/0317339 A1 Sep. 26, 2024

(30) Foreign Application Priority Data

Mar. 22, 2023 (CN) ......................... 202310285447.7

(51) Int. Cl.
*B62D 65/18* (2006.01)

(52) U.S. Cl.
CPC .................................... *B62D 65/18* (2013.01)

(58) Field of Classification Search
CPC ........ B62D 65/18; B65G 17/34; B65G 17/06; B65G 17/002; B65G 17/065
USPC ............................................... 198/465.1, 602
See application file for complete search history.

(56) References Cited

U.S. PATENT DOCUMENTS 4,944,229 A * 7/1990 Arakawa ................. B61B 13/00 104/287
5,012,917 A * 5/1991 Gilbert ................... B62D 65/18 198/465.1
6,938,752 B2 * 9/2005 Stewart ................ B65G 17/002 198/465.1
7,306,089 B2 * 12/2007 Ellens .................... B62D 65/18 198/795
7,731,013 B2 * 6/2010 Milner ................... B62D 65/18 198/463.3
7,866,445 B2 * 1/2011 Bukowski ................. B66F 7/18 187/269
7,971,536 B2 * 7/2011 Sugimoto .............. B65G 35/06 198/463.3
8,408,381 B2 * 4/2013 Murakami ............. B65G 37/02 198/465.1
9,637,363 B2 * 5/2017 Mohr ..................... B65G 35/06
9,938,126 B2 * 4/2018 Ooe ...................... B66F 7/0666
10,766,750 B2 * 9/2020 Ooe .......................... B66F 3/22

* cited by examiner

*Primary Examiner* — William R Harp
(74) *Attorney, Agent, or Firm* — JCIPRNET

(57) ABSTRACT

An assembling production system, which can improve assembling production efficiency, is provided. The assembling production system is adapted for assembling a part on a workpiece and includes multiple moving bodies for transportation, each transporting the workpiece; and a transporting device, transporting the moving bodies for transportation along a moving path, wherein each of the moving bodies for transportation includes a working platform for an operator to ride on, a supporting portion supporting the workpiece, and a lifting portion lifting the supporting portion, and the lifting portion lifts the supporting portion to change a height of the workpiece supported on the supporting portion relative to the working platform.

10 Claims, 14 Drawing Sheets

ASSEMBLING PRODUCTION SYSTEM

CROSS-REFERENCE TO RELATED APPLICATION

This application claims the priority benefit of China application serial no. 202310285447.7, filed on Mar. 22, 2023. The entirety of the above-mentioned patent application is hereby incorporated by reference herein and made a part of this specification.

BACKGROUND

Technical Field

The disclosure relates to an assembling production system.

Description of Related Art

In recent years, in order to ensure access to affordable, reliable, sustainable, and advanced energy for more people, research and development to improve energy efficiency that contribute to energy efficiency are being performed. However, in the technology regarding improving energy efficiency, the assembling production efficiency of the assembling production system is a topic.

In the prior art, during the process of assembling a workpiece such as a vehicle body structure, a transporting device may be used to transport the workpiece. In the transportation technology of using a transporting pallet to transport the workpiece, a lifter may be used to lift the workpiece at a fixed point, so that an operator may install parts under the workpiece. Such an approach helps the operator perform assembling operations on the workpiece in all directions, but makes it difficult to perform an assembling operation at a place such as a round-trip point on a moving path. Accordingly, in the transportation technology of using a conveyor belt to transport the workpiece, the assembling operation may continue to be performed at the place such as the round-trip point on the moving path. However, it is difficult to perform lifting on the conveyor belt, and the operator may usually perform the assembling operation on the workpiece only on two opposite side of the conveyor belt. Therefore, the assembling production efficiencies of the assembling production systems are low.

The disclosure aims to improve the assembling production efficiency of the assembling production system, thereby also contributing to energy efficiency.

SUMMARY

The disclosure provides an assembling production system, which is adapted for assembling a part on a workpiece and includes multiple moving bodies for transportation, individually transporting the workpiece; and a transporting device, transporting the moving bodies for transportation along a moving path. Each of the moving bodies for transportation includes a working platform for an operator to ride on, a supporting portion supporting the workpiece, and a lifting portion lifting the supporting portion. The lifting portion lifts the supporting portion to change a height of the workpiece supported on the supporting portion relative to the working platform.

DESCRIPTION OF THE EMBODIMENTS

Figure 1:
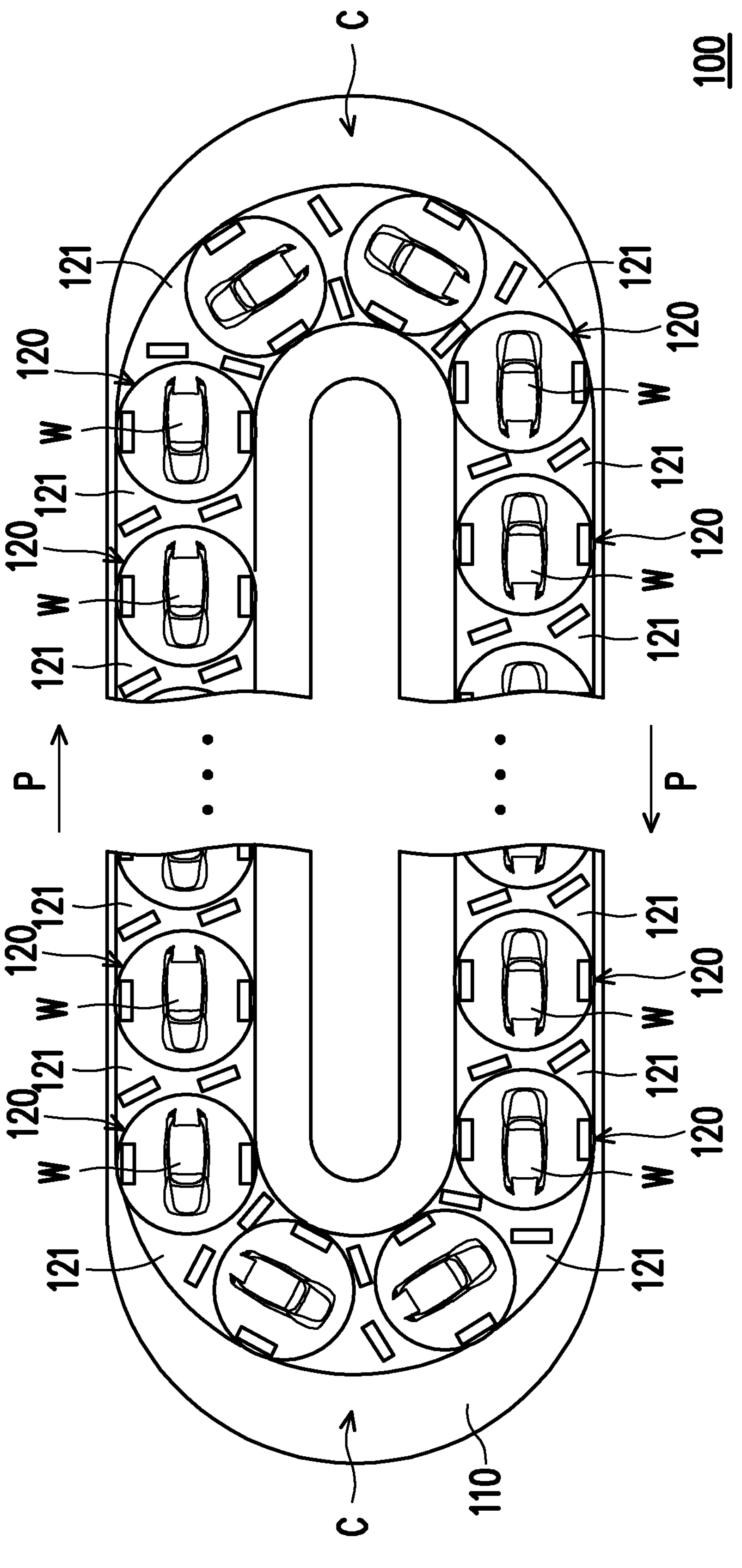
FIG. 1 is a schematic plan view of an assembling production system according to an embodiment of the disclosure.

The disclosure provides an assembling production system, which can improve assembling production efficiency.

The disclosure provides an assembling production system, which is adapted for assembling a part on a workpiece and includes multiple moving bodies for transportation, individually transporting the workpiece; and a transporting device, transporting the moving bodies for transportation along a moving path. Each of the moving bodies for transportation includes a working platform for an operator to ride on, a supporting portion supporting the workpiece, and a lifting portion lifting the supporting portion. The lifting portion lifts the supporting portion to change a height of the workpiece supported on the supporting portion relative to the working platform.

In an embodiment of the disclosure, the lifting portion only operates in a partial section of the moving path.

In an embodiment of the disclosure, the assembling production system further includes a fixed stand, disposed such that the operator may get down from the working platform to the fixed stand and provided with an operating portion for operating the lifting portion. The operator gets down to the fixed stand to operate the operating portion. The lifting portion lifts the supporting portion.

In an embodiment of the disclosure, the assembling production system further includes a power supply device, disposed around the transporting device, and in a case where the moving body for transportation moves to a vicinity of the power supply device via the transporting device, the lifting portion lifts the supporting portion via power supply of the power supply device.

In an embodiment of the disclosure, the power supply device is disposed on a fixed side of the transporting device to sequentially supply power to the lifting portion of each of the moving bodies for transportation.

In an embodiment of the disclosure, the power supply device supplies power to the lifting portion of the moving body for transportation and moves together with the moving body for transportation when supplying power.

In an embodiment of the disclosure, the power supply device moves to an initial position before supplying power when the lifting portion completes lifting and stops supplying power.

Based on the above, in the assembling production system of the disclosure, each of the moving bodies for transportation transports the workpiece, and the transporting device transports the moving bodies for transportation along the moving path. Each moving body for transportation includes the working platform for the operator to ride on, the supporting portion supporting the workpiece, and the lifting portion for lifting the supporting portion, and the lifting portion lifts the supporting portion to change the height of the workpiece supported on the supporting portion relative to the working platform. In this way, the operator may perform the assembling operation on the workpiece on the working platform in all directions and lift the workpiece without stopping the movement of the moving body for transportation via the transporting device during the process of the assembling operation, thereby contributing to the continuous assembling operation. Accordingly, the assembling production system of the disclosure can improve assembling production efficiency.

In order for the features and advantages of the disclosure to be more comprehensible, the following specific embodiments are described in detail in conjunction with the drawings.

Figure 2:
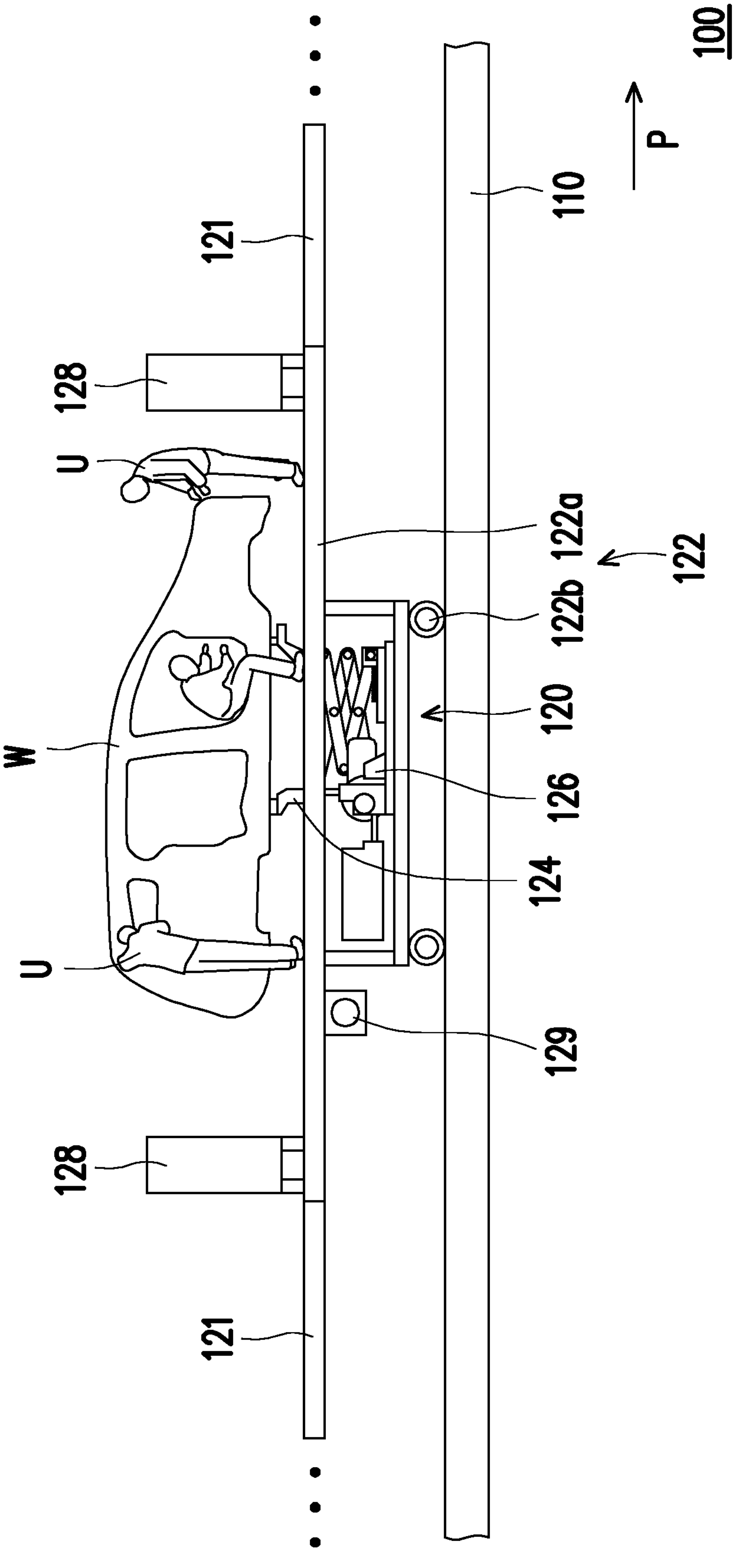
FIG. 2 is a partial schematic side view of a moving body for transportation used in the assembling production system shown in FIG. 1.
Figure 3:
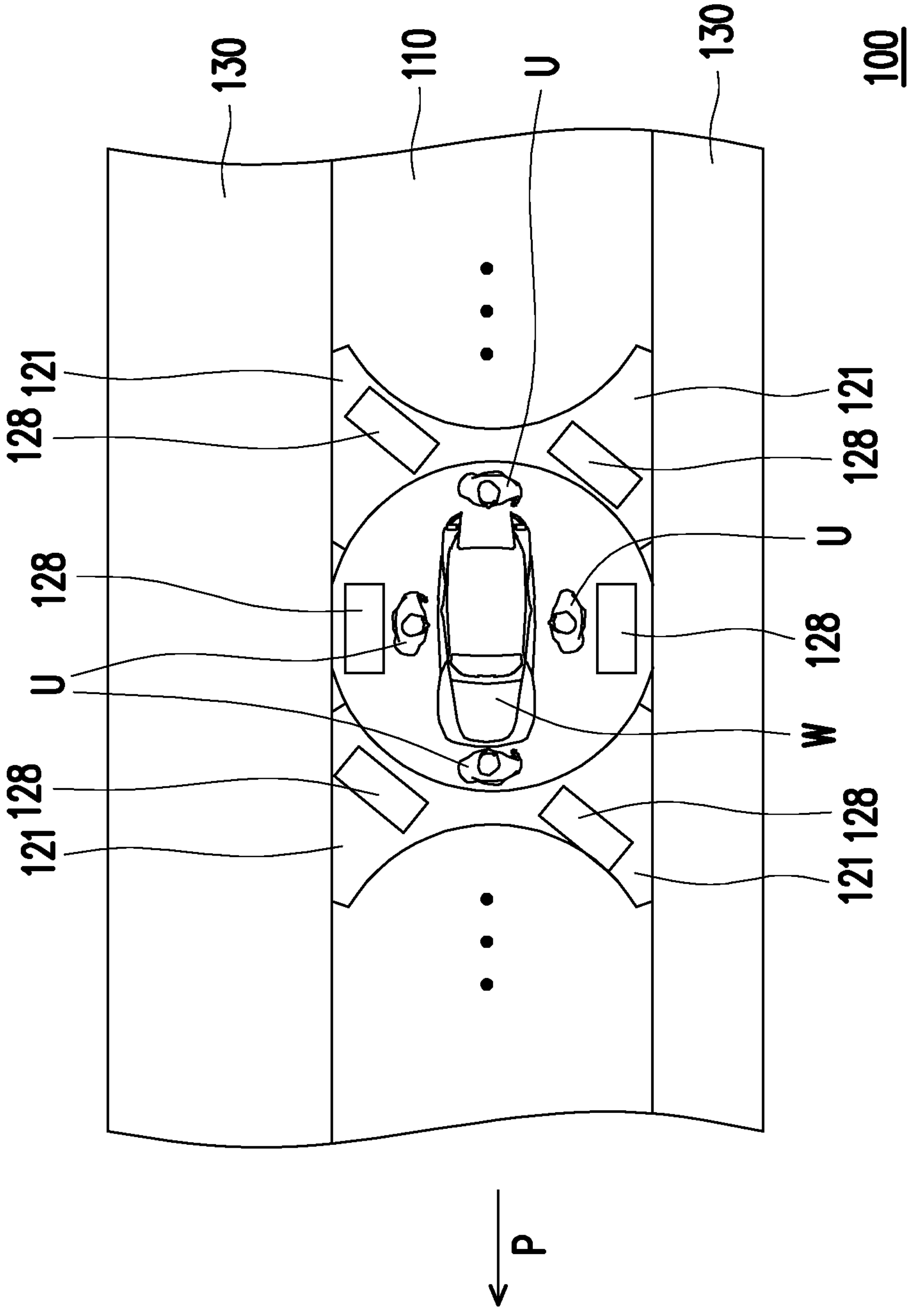
FIG. 3 is a partial schematic plan view of the moving body for transportation used in the assembling production system shown in FIG. 1.

Reference will now be made in detail to the exemplary embodiments of the disclosure, examples of which are illustrated in the accompanying drawings. FIG. 1 is a schematic plan view of an assembling production system according to an embodiment of the disclosure, FIG. 2 is a partial schematic side view of a moving body for transportation used in the assembling production system shown in FIG. 1, FIG. 3 is a partial schematic plan view of the moving body for transportation used in the assembling production system shown in FIG. 1, FIG. 4A to FIG. 4E are partial schematic plan views of each assembling process when the assembling production system shown in FIG. 1 performs an assembling operation, and FIG. 5A to FIG. 5F are partial schematic side views of each assembling process when the assembling production system shown in FIG. 1 performs the assembling operation. The specific structure and the operation process of an assembling production system 100 of the embodiment will be described below with reference to FIG. 1 to FIG. 5F, which is only an example of the disclosure, and the disclosure is not limited thereto.

Please refer to FIG. 1 to FIG. 3. In the embodiment, the assembling production system 100 includes a transporting device 110 and multiple moving bodies for transportation 120. The transporting device 110 transports the moving bodies for transportation 120 along a moving path P. Each of the moving bodies for transportation 120 supports a workpiece W. Thereby, each of the moving bodies for transportation 120 transports the workpiece W via the transporting device 110. For example, the transporting device 110 is, for example, a conveying equipment such as a conveyor belt used on a production line and may be disposed in a ring shape as shown in FIG. 1 (having a round-trip point C to transport back and forth) or in an unshown linear shape (for unidirectional transportation). Furthermore, the moving body for transportation 120 is, for example, a trolley, and the moving bodies for transportation 120 are, for example, connected in series at the head and tail by a connecting plate 121, so as to be transported via the transporting device 110 to move along the moving path P. A corresponding workpiece W is placed on each moving body for transportation 120. When the assembling production system 100 is applied in a vehicle mass production line, the workpiece W is, for example, a frame structure used in a vehicle, but not limited thereto. From this, it can be seen that the workpiece W placed on the moving body for transportation 120 may move along the moving path P along with the moving body for transportation 120, thereby being transported via the transporting device 110. At the same time, the workpiece W may be assembled on the moving body for transportation 120 that is moving, such as assembling unshown parts on the workpiece W. However, the disclosure does not limit the application manner of the assembling production system 100 (that is, not limited to being used for installing parts on a vehicle body structure), which may be adjusted according to requirements.

Furthermore, in the embodiment, as shown in FIG. 2 and FIG. 3, each moving body for transportation 120 includes a working platform 122 for an operator U to ride on, a supporting portion 124 for supporting the workpiece W, and a lifting portion 126 for lifting the supporting portion 124. The working platform 122 includes, for example, a planar pallet 122*a* and wheels 122*b* disposed below the pallet 122*a*, so that the operator U may be carried via the pallet 122*a*, and one of the moving bodies for transportation 120 may be transported to the outside of the transporting device 110 via the wheels 122*b* when not in use, but not limited thereto. Furthermore, the supporting portion 124 is, for example, a column supporter, and disposed at an approximately central position of the working platform 122 and supports the workpiece W from below the workpiece W. That is, the workpiece W is placed at the approximately central position on the working platform 122 to correspond to the supporting portion 124, thereby being supported by the supporting portion 124. Furthermore, the lifting portion 126 is, for example, a scissor lifter, and disposed below the working platform 122 and is connected to the supporting portion 124, thereby lifting the supporting portion 124 and raising the workpiece W upward from below the workpiece. In addition, each moving body for transportation 120 further includes a storage rack 128 for storing parts. The storage rack 128 is, for example, disposed on the working platform 122 or the connecting plate 121 and is dispersedly disposed around the workpiece W and the supporting portion 124 supporting the workpiece W (not limited thereto).

It can be seen from this that in the embodiment, the lifting portion 126 lifts the supporting portion 124 to change the height of the workpiece W supported on the supporting portion 124 relative to the working platform 122, so that the operator U may assemble parts below the workpiece W during a transportation process of the workpiece W. In particular, one or more operators U may assemble the parts onto the workpiece W placed at the center of the working platform 122 in all directions. In this way, the operator U may perform the assembling operation on the workpiece W on the working platform 122 in all directions and lift the workpiece W without stopping the movement of the moving body for transportation 120 via the transporting device 110 during the process of the assembling operation, thereby contributing to the continuous assembling operation. In particular, since the operator U rides on the moving body for transportation 120 to perform the assembling operation, there is no need to pause the movement of the moving body for transportation 120 during the process of the moving body for transportation 120 moving along the moving path P and passing through the round-trip point C, and the operator U may still perform the all-round assembling operation on the workpiece W on the moving body for transportation 120. Accordingly, the assembling production system 100 can improve assembling production efficiency.

Figure 4A:
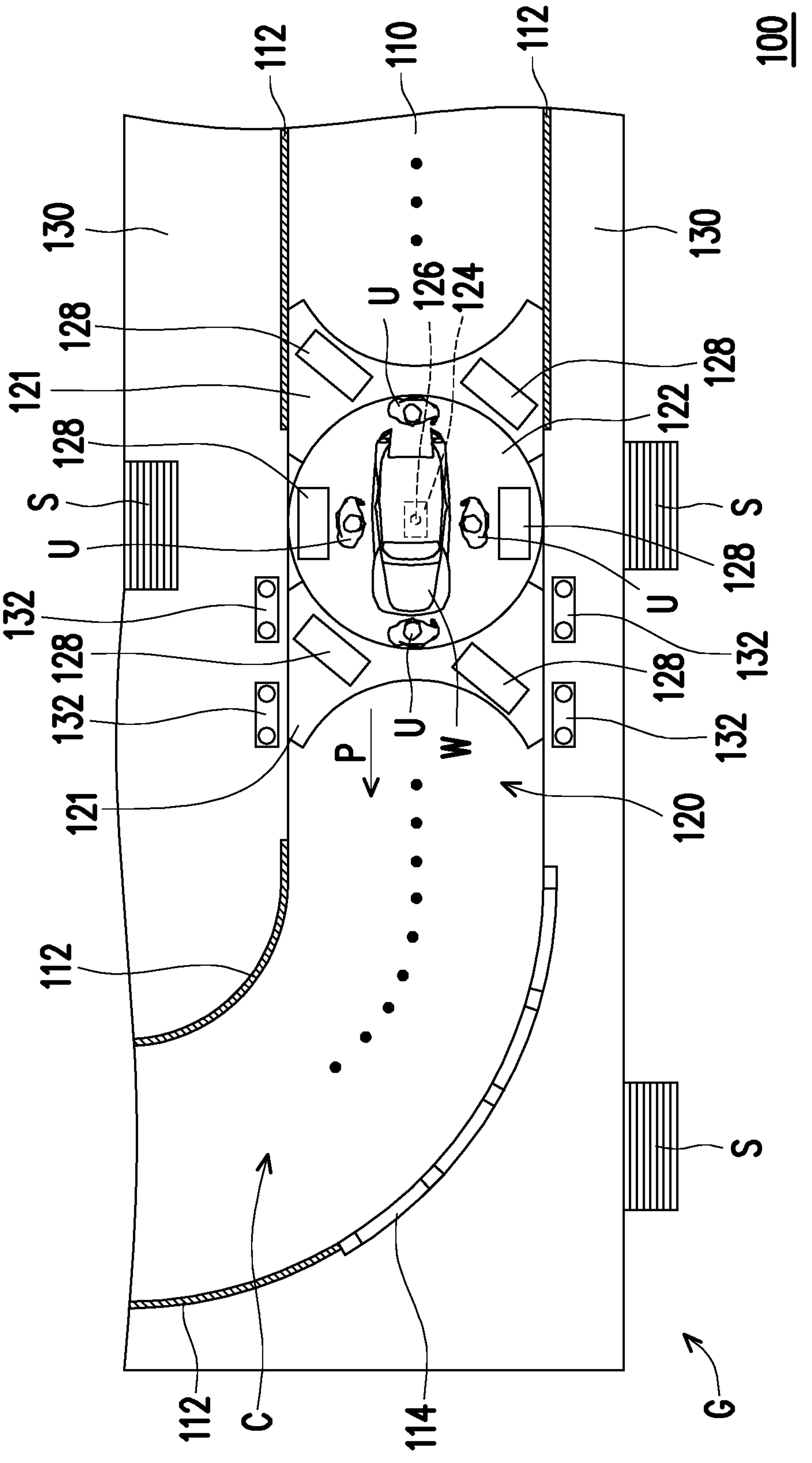
FIG. 4A to FIG. 4E are partial schematic plan views of each assembling process when the assembling production system shown in FIG. 1 performs an assembling operation.

Furthermore, please refer to FIG. 4A to FIG. 4E. In the embodiment, as an example, the assembling process of the assembling production system 100 when performing the assembling operation is as follows. The drawings show the assembling operation on the moving body for transportation 120 as an example, but in fact, the moving bodies for transportation 120 may perform the assembling operations at the same time. First, as shown in FIG. 4A, during the process of the moving body for transportation 120 moving along the moving path P via the transportation by the transporting device 110, the corresponding workpiece W is placed on each moving body for transportation 120, and the operator U rides on the corresponding working platform 122. Safety fences 112 are also disposed on two sides of the transporting device 110 (for example, a conveyor belt), which can prevent the operator U riding on the working platform 122 of the moving body for transportation 120 from falling during the process of the moving body for transportation 120 moving via the transportation by the transporting device 110. Prior to this, the operator U may assemble other parts of the workpiece W not yet lifted during the process of the moving body for transportation 120 moving via the transportation by the transporting device 110. However, the disclosure is not limited thereto and may be adjusted according to requirements. For example, the safety fence 112 does not have to be disposed. In particular, the safety fence 112 may be omitted at a straight portion of the transporting device 110, so that the operator U can freely walk from the working platform 122 to a fixed stand 130.

Furthermore, in the embodiment, the assembling production system 100 further includes the fixed stand 130. The fixed stand 130 is disposed around the transporting device 110 such that the operator U may get down from the working platform 122 to the fixed stand 130 and is disposed to not move relative to the transporting device 110 transporting the moving body for transportation 120 along the moving path P. Therefore, the operator U may board the fixed stand 130 from a ground G via stairs S, thereby riding on the working platform 122 disposed on the moving body for transportation 120 transported by the transporting device 110 to assemble the workpiece W during the moving process of the moving body for transportation 120. Similarly, the operator U may get down from the working platform 122 disposed on the moving body for transportation 120 transported by the transporting device 110 to the fixed stand 130, thereby going down to the ground G via the stairs S from the fixed stand 130. Furthermore, the fixed stand 130 is provided with an operating portion 132 for operating the lifting portion 126. That is, the operating portion 132 is disposed on the fixed stand 130 different from the moving body for transportation 120 and does not move along with the transporting device 110 or the moving body for transportation 120. Moreover, the operating portion 132 is disposed in a specific section of the moving path P of the transporting device 110, such as being disposed on an upstream side of the moving path P of the transporting device 110 close to the round-trip point C (that is, at a position not yet reaching the round-trip point C) as shown in FIG. 4A. As a result, the lifting portion 126 of the moving body for transportation 120 operates only in a partial section of the moving path P. For example, only when the moving body for transportation 120 moves to a vicinity of the operating portion 132 via the transporting device 110, the lifting portion 126 lifts the supporting portion 124 via the operation of the operating portion 132 by the operator U. In this way, erroneous lifting can be prevented to reduce errors in the assembling operation.

Figure 4B:
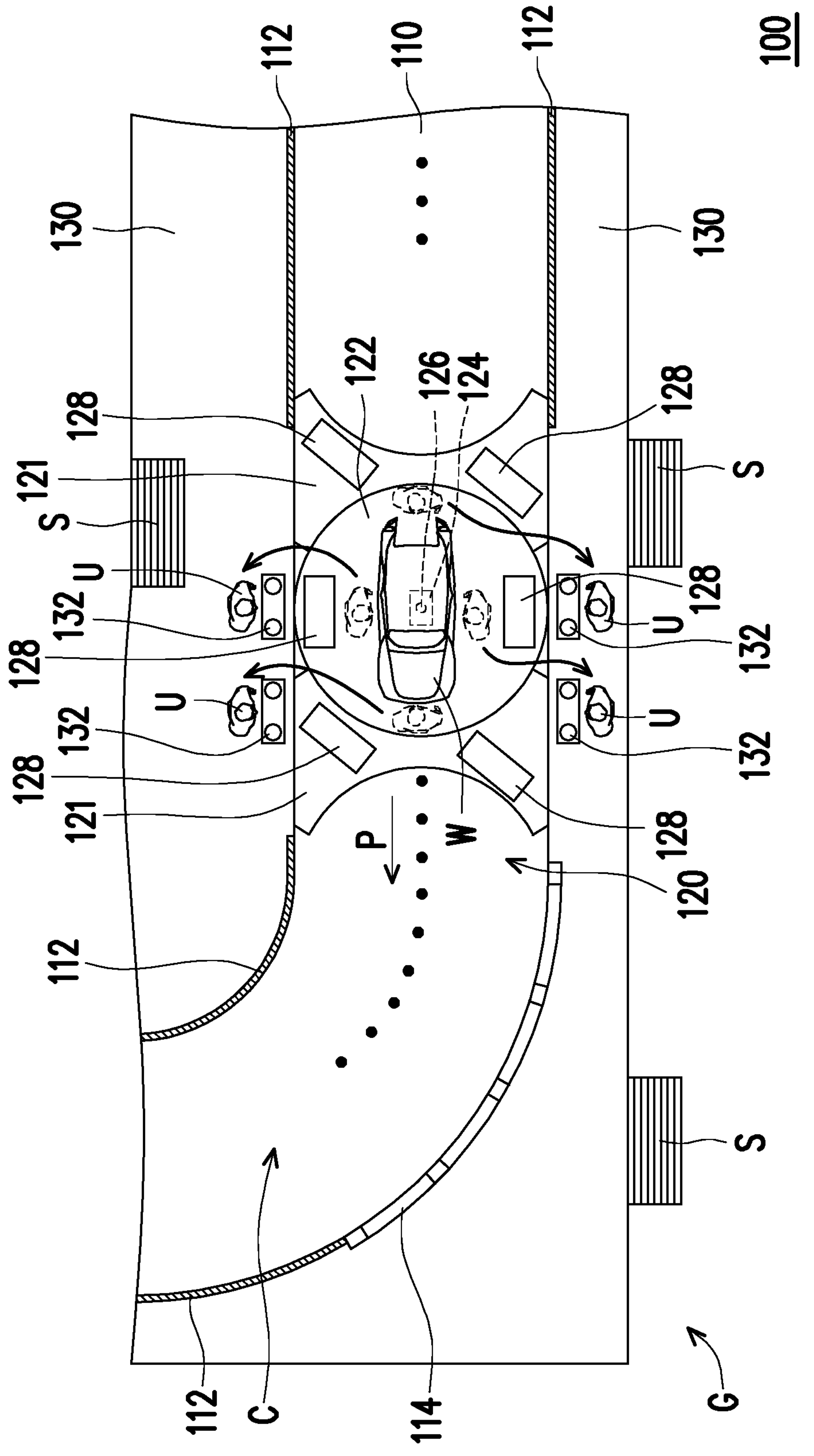

In particular, in the embodiment, as shown in FIG. 4B, in a case where the moving body for transportation 120 moves to the vicinity of the operating portion 132 via the transporting device 110, the operator U gets down to the fixed stand 130 to operate the operating portion. 132, and the lifting portion 126 lifts the supporting portion 124. Since the operating portion 132 is disposed on the fixed stand 130 different from the moving body for transportation 120, it is preferable that all the operators U (four in the embodiment) riding on the moving body for transportation 120 leaves the working platform 122 of the moving body for transportation 120 to move to the fixed stand 130, so that all the operators U may operate the operating portion 132 at the same time. In this way, erroneous lifting can be prevented to reduce errors in the assembling operation. During the transportation process of the transporting device 110, it is preferable that the transportation speed of the transporting device 110 allows the operator U to move from the moving body for transportation 120 that is moving to the fixed stand 130 (that is, at a slow speed) without having to stop a transporting action of the transporting device 110 when operating the operating portion 132. In addition, the position of the transporting device 110 corresponding to the vicinity of the operating portion 132 is not provided with the safety fence 112, so that the operator U may move from the working platform 122 of the moving body for transportation 120 to the fixed stand 130. However, in an unshown embodiment, a movable door may also be disposed to open via an operation by the operator U or via sensing when the moving body for transportation 120 approaches the operating portion 132, so that the operator U may pass through to move from the working platform 122 of the moving body for transportation 120 to the fixed stand 130. However, the disclosure is not limited thereto and may be adjusted according to requirements.

Figure 4C:
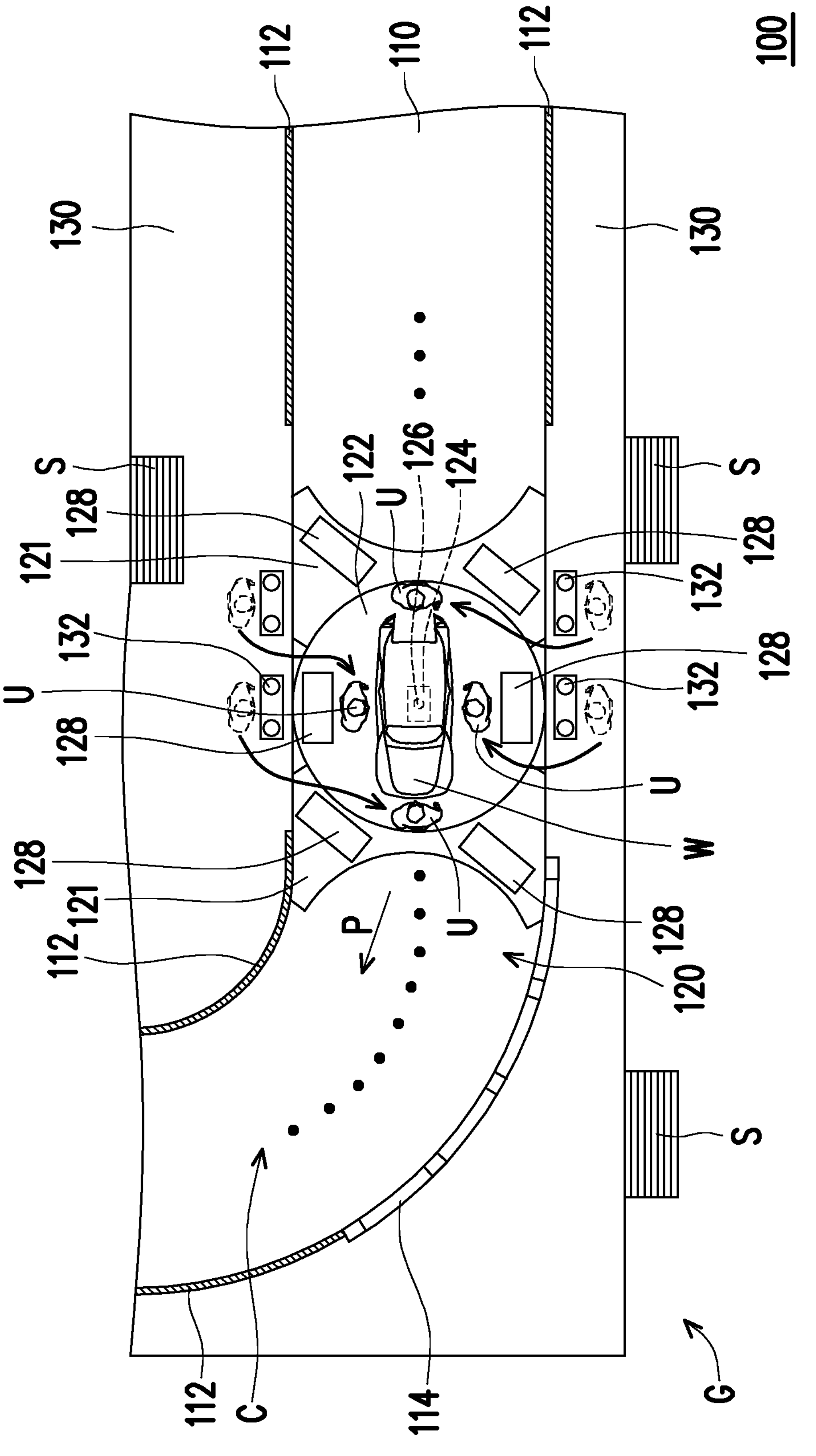
Figure 4D:
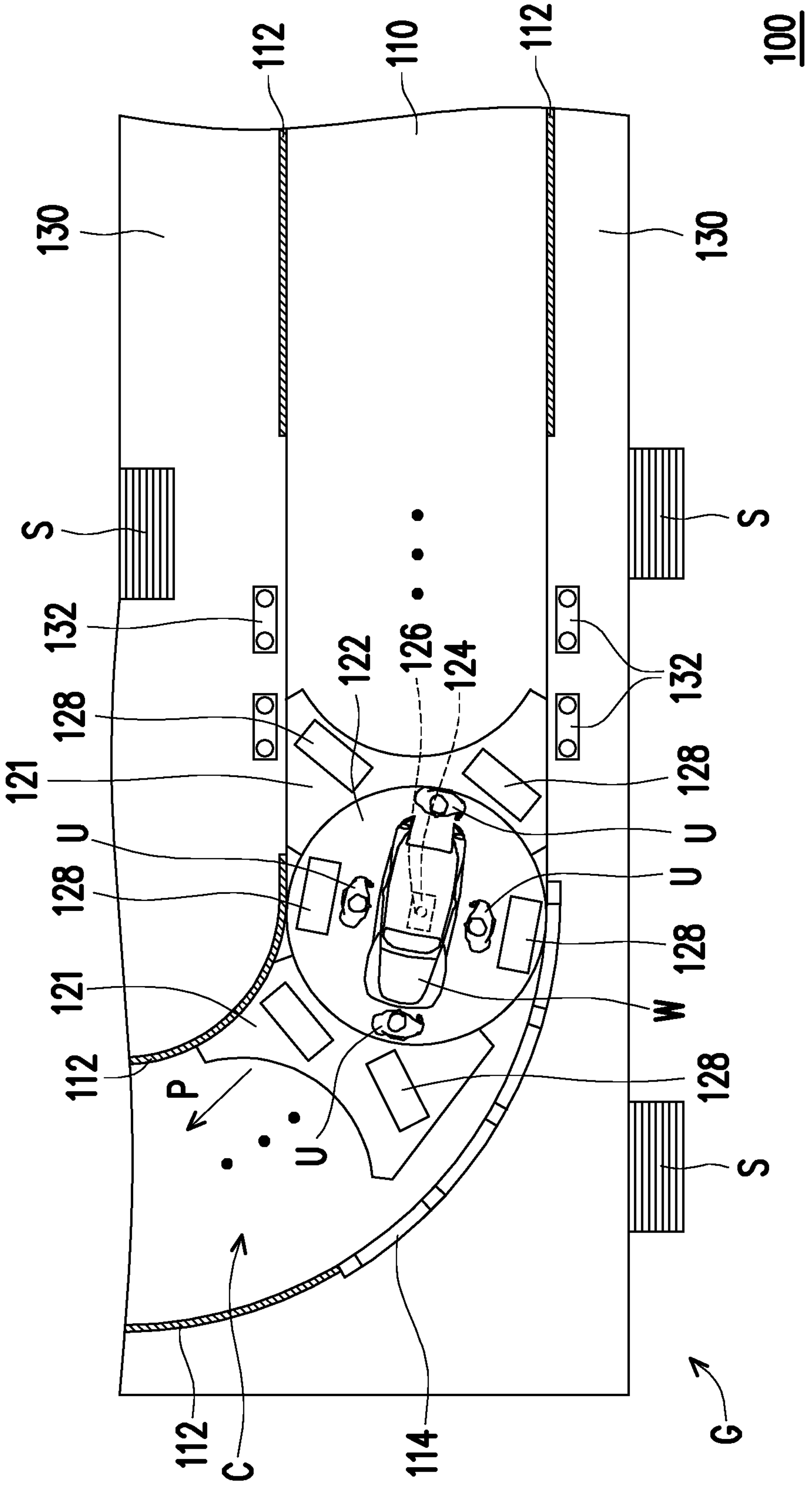

Furthermore, in the embodiment, as shown in FIG. 4C, after the lifting portion 126 starts to rise upward (such as the lifting portion 126 starting to extend upward) via the operation of the operating portion 132 (such as pressing a switch button, etc.), the operator U may return to the working platform 122 of the moving body for transportation 120 to continue assembling the workpiece W. After the lifting portion 126 lifts the supporting portion 124 via the operation of the operating portion 132, the supporting portion 124 starts to rise upward along with the lifting portion 126, so that the workpiece W supported on the supporting portion 124 is raised upward (as explained later). In particular, the workpiece W is raised upward to a preset height that exposes a lower surface and allows the operator U to assemble the parts below the workpiece W. After the workpiece W on the supporting portion 124 moves upward to the preset height via the lifting of the lifting portion 126, the lifting portion 126 stops lifting the supporting portion 124 (as shown by the process changing from FIG. 4C to FIG. 4D), and the operator U may assemble the parts below the workpiece W. At this time, since the operator U, the workpiece W, and the storage rack 128 for storing the parts are all located on the working platform 122, during the process of the operator U assembling the parts below the workpiece W, the transporting device 110 does not need to stop the transportation of the moving body for transportation 120, that is, the transporting action of the workpiece W is still in progress. In this way, the assembling production efficiency of the workpiece W by the assembling production system 100 can be improved. However, the disclosure is not limited thereto and may be adjusted according to requirements. For example, as long as the height of the workpiece W can be changed via the lifting portion 126 from a height where the operator U works in a bent posture to a height where the operator U works in an upright posture, the working posture of the operator U can be changed into a less burdensome posture.

Figure 4E:
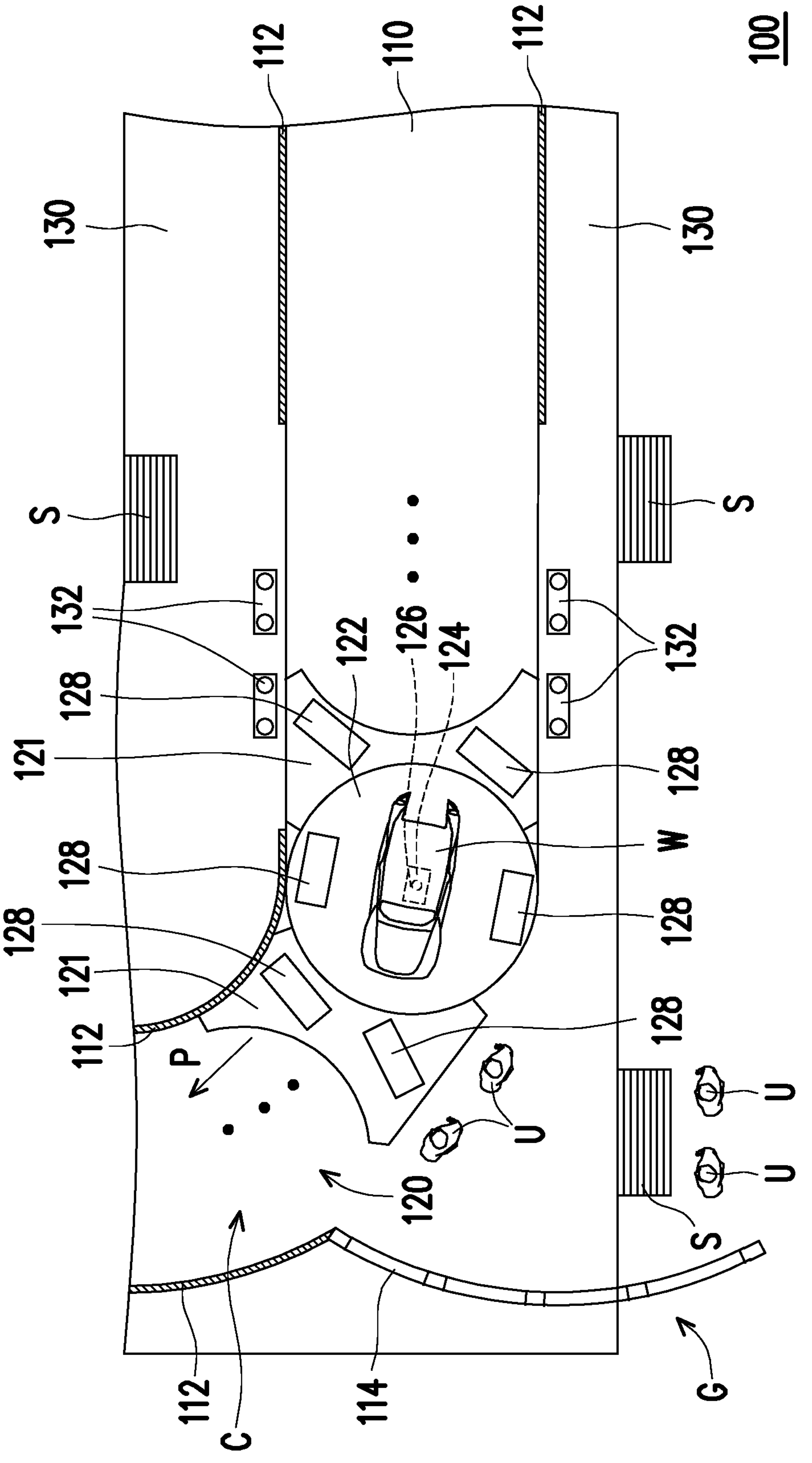

Finally, in the embodiment, as shown in FIG. 4E, after completing an assembling action of assembling the parts below the workpiece W, the operator U may leave the working platform 122 of the moving body for transportation 120. For example, a movable door 114 is disposed on the upstream side of the moving path P of the transporting device 110 close to the round-trip point C (that is, at the position not yet reaching the round-trip point C), so as to be opened via the operation by the operator U or via sensing when the moving body for transportation 120 approaches, so that the operator U may pass through to leave the moving body for transportation 120. However, in an unshown embodiment, the region of the transporting device 110 may not be provided with the safety fence to facilitate the operator U to move from the working platform 122 of the moving body for transportation 120 to the fixed stand 130. Alternatively, in other unshown embodiments, after completing the assembling action of assembling the parts below the workpiece W, the operator U does not leave the moving body for transportation 120, but operates the lifting of the lifting portion 126 using another operating portion, so that the lifting portion 126 drives the supporting portion 124 to be lowered downward (that is, the lifting portion 126 contracts downward) and the workpiece W supported on the supporting portion 124 is lowered downward to the working platform 122, so that the operator U may perform other assembling actions (such as assembling other parts) in parts other than below the workpiece W. The disclosure is not limited thereto and may be adjusted according to requirements.

Figure 5A:
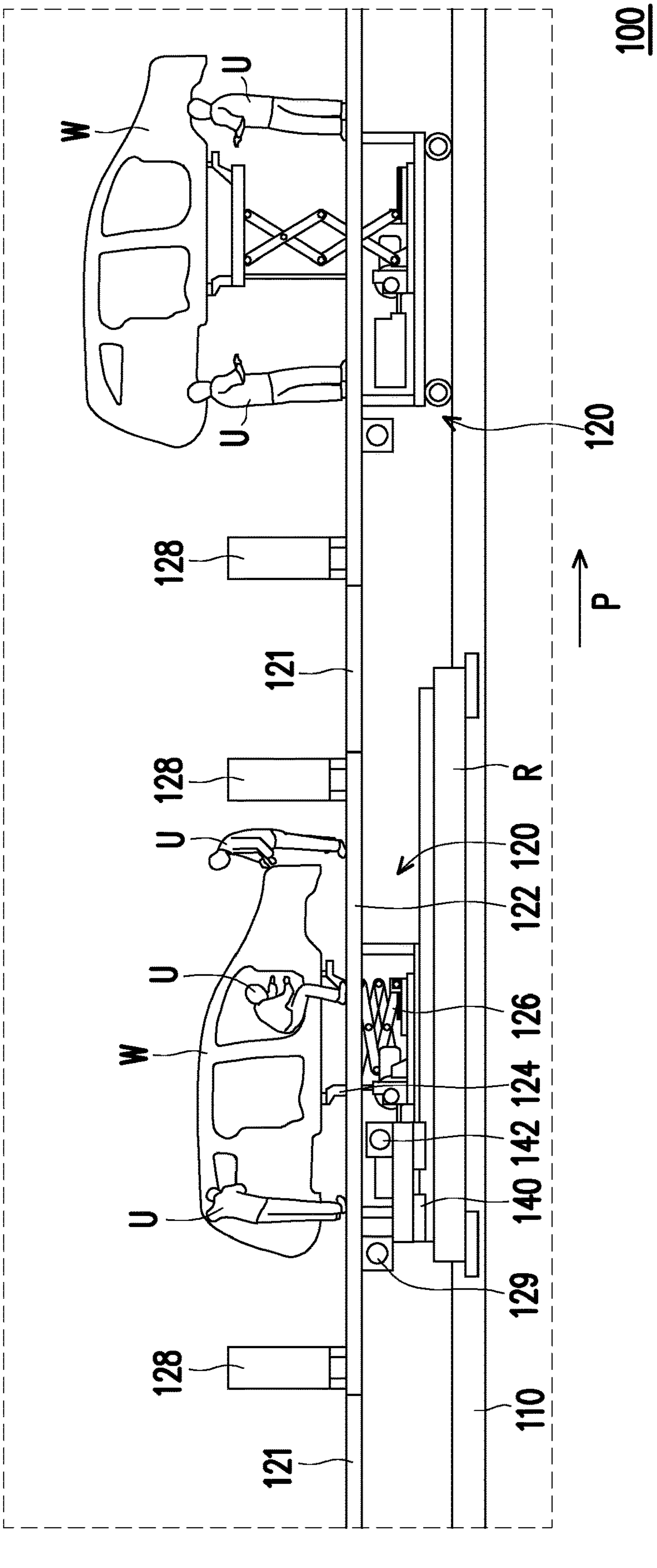
FIG. 5A to FIG. 5F are partial schematic side views of each assembling process when the assembling production system shown in FIG. 1 performs the assembling operation.

In addition, please refer to FIG. 5A to FIG. 5F. In the embodiment, as an example, the assembling process of the assembling production system 100 when performing the assembling operation is as follows. First, as shown in FIG. 5A, during the process of the moving body for transportation 120 moving along the moving path P via the transportation by the transporting device 110, the workpiece W is already placed on the moving body for transportation 120, and the operator U is riding on the working platform 122. The assembling production system 100 further includes a power supply device 140. The power supply device 140 is disposed around the transporting device 110, and in a case where the moving body for transportation 120 moves to a vicinity of the power supply device 140 via the transporting device 110, the lifting portion 126 lifts the supporting portion 124 via power supply of the power supply device 140. In particular, the power supply device 140 is disposed on a fixed side of the transporting device 110. For example, as shown in FIG. 5A, only one power supply device 140 is disposed on the moving path P of the transporting device 110 to sequentially supply power to the lifting portion 126 of each of the moving bodies for transportation 120 that are moving in the specific section of the moving path P of the transporting device 110. In other words, the lifting portion 126 of each moving body for transportation 120 only operates in a partial section of the moving path P. For example, the lifting portion 126 lifts the supporting portion 124 via the power supply of the power supply device 140 only when each moving body for transportation 120 moves to the vicinity of the power supply device 140 via the transporting device 110. In this way, erroneous lifting can be prevented to reduce errors in the assembling operation.

Figure 5B:
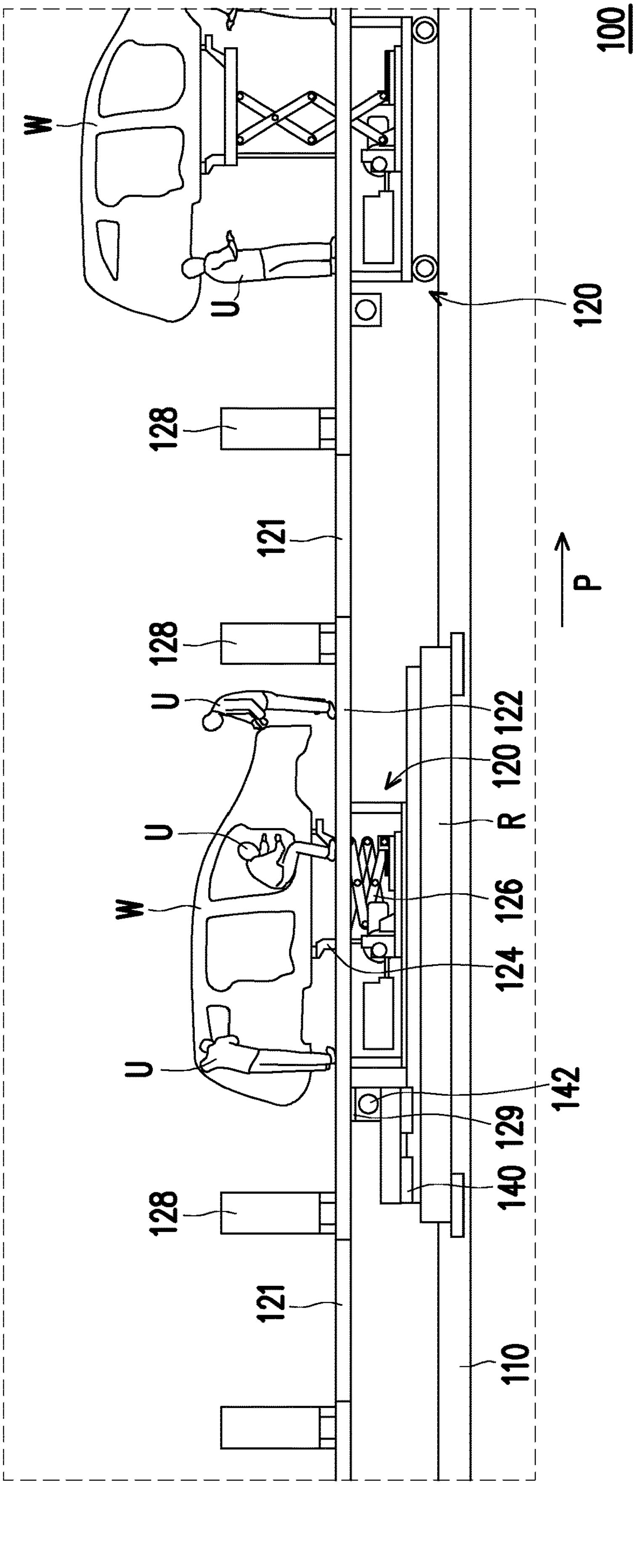
Figure 5C:
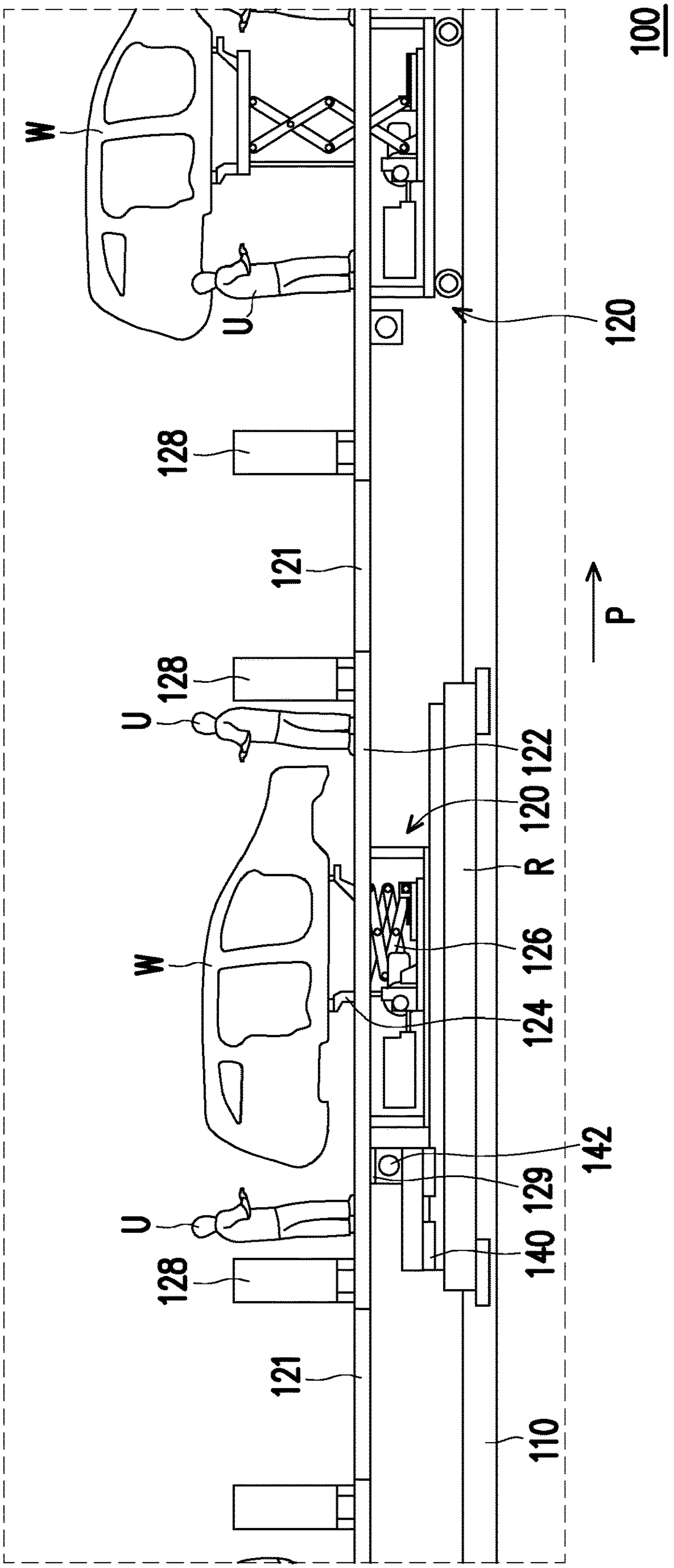
Figure 5D:
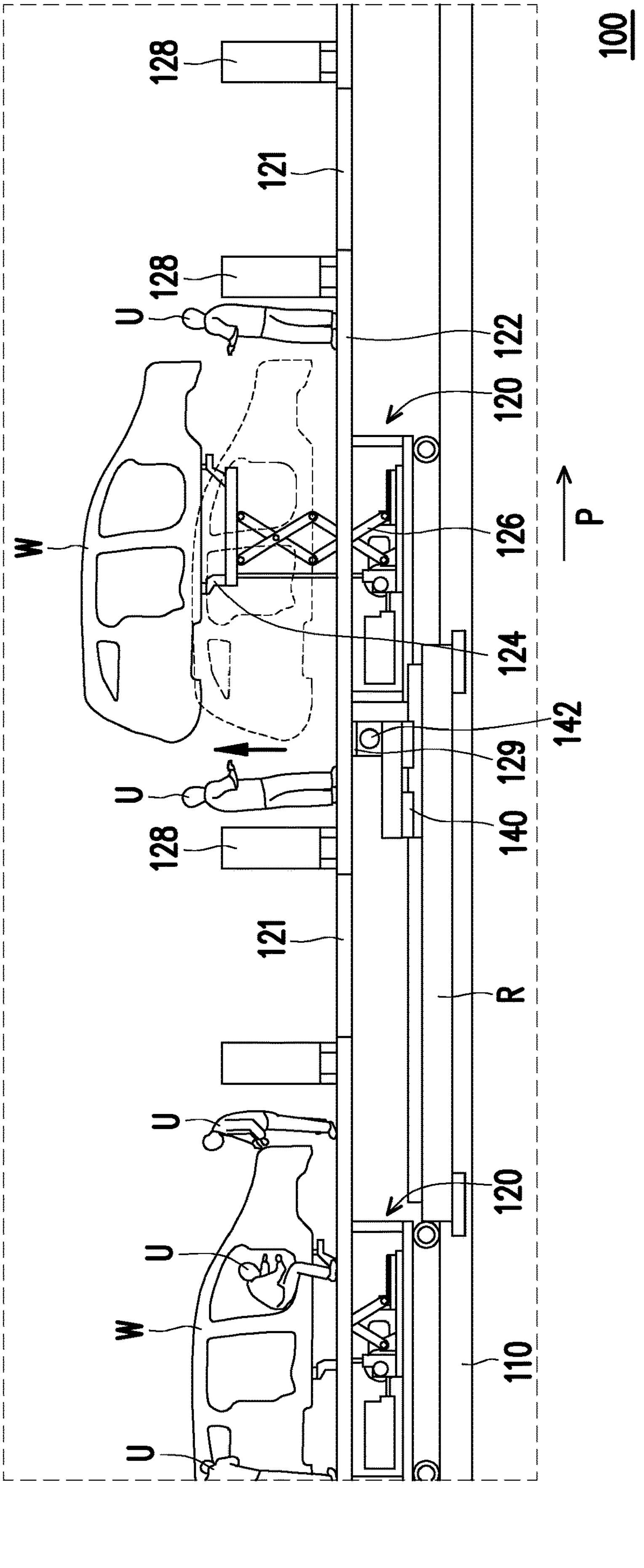

In particular, in the embodiment, a power supply contact 129 is disposed on a lower side of the working platform 122 of the moving body for transportation 120. In the case where the moving body for transportation 120 moves to the vicinity of the power supply device 140 via the transporting device 110, when the moving body for transportation 120 moves to a point where the power supply contact 129 is docked with a power supply end portion 142 of the power supply device 140 as shown in FIG. 5B, the power supply device 140 may start supplying power to the lifting portion 126 via the power supply end portion 142 and the power supply contact 129. Subsequently, as shown in FIG. 5C, the operator U may operate the operating portion 132. For example, as shown in FIG. 4B, the operator U once leaves the working platform 122 of the moving body for transportation 120 and goes to the fixed stand 130 to operate the operating portion 132. Then, as shown in FIG. 4C, the operator U returns to the working platform 122 of the moving body for transportation 120 to continue assembling the workpiece W. Subsequently, as shown in FIG. 5D, the lifting portion 126 lifts the supporting portion 124 via the power supply of the power supply device 140 to change the height of the workpiece W supported on the supporting portion 124 relative to the working platform 122. That is, in a case where the operating portion 132 is not operated as shown in FIG. 4B and FIG. 4C, even if power is supplied to the lifting portion 126 via the power supply device 140, the lifting portion 126 still cannot be lifted. Accordingly, in a case where the power supply device 140 does not supply power to the lifting portion 126 as shown in FIG. 5B and FIG. 5C, even if the operating portion 132 is operated, the lifting portion 126 still cannot be lifted. Therefore, preferably, the power supply device 140 and the operating portion 132 are at approximately corresponding positions. However, in other unshown embodiments, the operating portion 132 and the power supply device 140 are not limited to being used at the same time. For example, each moving body for transportation 120 may be provided with a battery to supply power or each moving body for transportation 120 may be provided with an operating portion to operate the lifting portion 126. The disclosure does not limit whether the power supply device 140 and the operating portion 132 are provided, which may be adjusted according to requirements.

Furthermore, in the embodiment, as shown in FIG. 5C and FIG. 5D, the power supply device 140 supplies power to the lifting portion 126 of the moving body for transportation 120 that is moving and moves together with the moving body for transportation 120 when supplying power. For example, the power supply device 140 is disposed on a movement rail R disposed near the transporting device 110 and may move along the movement rail R. Furthermore, an unshown connecting structure may be disposed between the power supply device 140 and the working platform 122 of the moving body for transportation 120. When the moving body for transportation 120 moves until the power supply contact 129 is docked with the power supply end portion 142 of the power supply device 140 as shown in FIG. 5B, the power supply device 140 and the working platform 122 of the moving body for transportation 120 are connected via the connecting structure, so that when the power supply device 140 starts supplying power to the lifting portion 126, the power supply device 140 may also move along the movement rail R relative to the transporting device 110 along with the movement of the moving body for transportation 120. In other words, the power supply and the operation of the lifting portion 126 can be performed without stopping the movement of the moving body for transportation 120, and after the power supply device 140 supplies power to the lifting portion 126, the lifting portion 126 may continue to receive power from the power supply device 140 during the process of lifting via the operation by the operating portion 132 until being lifted to the preset height, which contributes to the continuous assembling operation. However, the disclosure is not limited thereto and may be adjusted according to requirements.

Figure 5E:
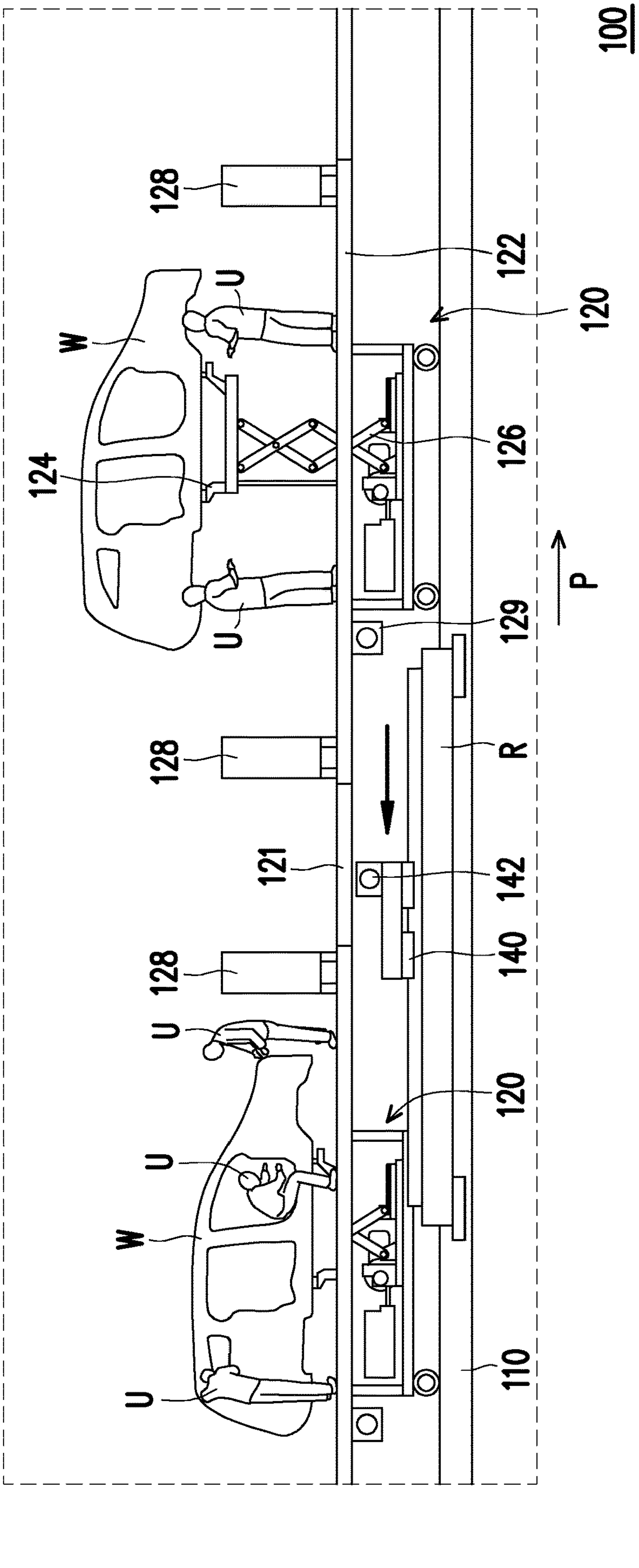
Figure 5F:
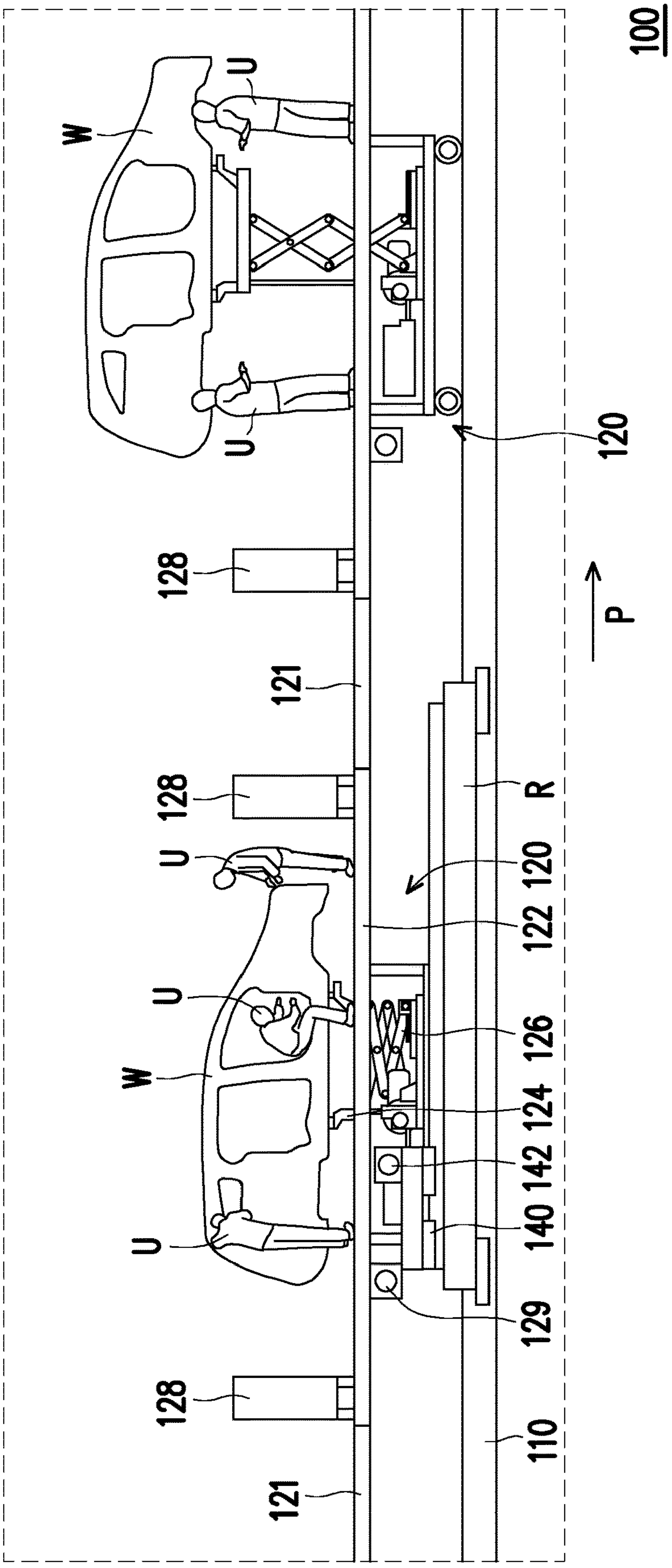

Next, in the embodiment, as shown in FIG. 5E, after the workpiece W on the supporting portion 124 moves upward to the preset height via the lifting of the lifting portion 126, the lifting portion 126 stops lifting the supporting portion 124, and the operator U may assemble the parts below the workpiece W. At this time, the power supply device 140 moves to the initial position before supplying power when the lifting portion 126 completes lifting and stops supplying power. That is, the power supply device 140 moves in a reverse direction along the movement rail R to the initial position before supplying power via an unshown driving device, etc. In this way, as shown in FIG. 5F, in a case where the next moving body for transportation 120 after the moving body for transportation 120 that has completed lifting moves to the vicinity of the power supply device 140, the power supply device 140 moved to the initial position before supplying power may supply power to the lifting portion 126 of the next moving body for transportation 120 again as shown in FIG. 5A to FIG. 5D. In this way, the power supply device 140 may sequentially supply power to the lifting portion 126 of each of the moving bodies for transportation 120 that are moving in the specific section of the moving path P of the transporting device 110, thereby contributing to the continuous assembling operation. However, the disclosure is not limited thereto and may be adjusted according to requirements.

In summary, in the assembling production system of the disclosure, each of the moving bodies for transportation transports the workpiece, and the transporting device transports the moving bodies for transportation along the moving path. Each moving body for transportation includes the working platform for the operator to ride on, the supporting portion supporting the workpiece, and the lifting portion for lifting the supporting portion, and the lifting portion lifts the supporting portion to change the height of the workpiece supported on the supporting portion relative to the working platform. In this way, the operator may perform the assembling operation on the workpiece on the working platform in all directions and lift the workpiece without stopping the movement of the moving body for transportation via the transporting device during the process of the assembling operation, thereby contributing to the continuous assembling operation. Preferably, the lifting portion may only operate in a partial section of the moving path to prevent erroneous lifting to reduce errors in the assembling operation. Alternatively, the operating portion and the power supply device may be provided, so that when the moving body for transportation moves to the vicinity of the operating portion or the power supply device via the transporting device, the lifting portion is operated or powered, so that the supporting portion is lifted. Accordingly, the assembling production system of the disclosure can improve assembling production efficiency.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An assembling production system, adapted for assembling a part on a workpiece, comprising:

a plurality of moving bodies for transportation, each transporting a respective workpiece;

a transporting device having a conveyor, transporting the moving bodies for transportation along a moving path; and a fixed stand, disposed around the transporting device and disposed to not move relative to the transporting device transporting the moving body for transportation along the moving path, wherein each of the moving bodies for transportation comprises a working platform, a supporter supporting the workpiece, and a lifter lifting the supporter, the lifter lifts the supporter to change a height of the workpiece supported on the supporter relative to the working platform, and the fixed stand is provided with an operating switch for operating the lifter, and the lifter lifts the supporter via an operation of the operating switch.

2. The assembling production system according to claim 1, wherein:

the lifter operates only in a partial section of the moving path.

3. The assembling production system according to claim 2, further comprising:

a power supply device, disposed around the transporting device, wherein in a case where the moving body for transportation moves to a vicinity of the power supply device via the transporting device, lifter lifts the supporter via power supply of the power supply device.

4. The assembling production system according to claim 3, wherein:

the power supply device is disposed on a fixed side of the transporting device to sequentially supply power to the lifter of each of the moving bodies for transportation.

5. The assembling production system according to claim 3, wherein:

the power supply device supplies power to the lifter of the moving body for transportation that is moving and moves together with the moving body for transportation when supplying power.

6. The assembling production system according to claim 5, wherein:

the power supply device is configured to move to an initial position before supplying power after the lifter completes lifting and stops supplying power.

7. The assembling production system according to claim 1, further comprising:

a power supply device, disposed around the transporting device, wherein in a case where the moving body for transportation moves to a vicinity of the power supply device via the transporting device, the lifter lifts the supporter via power supply of the power supply device.

8. The assembling production system according to claim 7, wherein:

the power supply device is disposed on a fixed side of the transporting device to sequentially supply power to the lifter of each of the moving bodies for transportation.

9. The assembling production system according to claim 7, wherein:

the power supply device supplies power to the lifter of the moving body for transportation that is moving and moves together with the moving body for transportation when supplying power.

10. The assembling production system according to claim 9, wherein:

the power supply device is configured to move to an initial position before supplying power after the lifter completes lifting and stops supplying power.

* * * * *